United States Patent [19]
Rinehart

[11] Patent Number: 5,979,953
[45] Date of Patent: Nov. 9, 1999

[54] VEHICLE BUMPER WITH INTEGRAL JACK METHOD OF MANUFACTURE THEREOF

[75] Inventor: Gregory E. Rinehart, Weatherford, Tex.

[73] Assignee: The Lube Company, Arlington, Tex.

[21] Appl. No.: 09/152,535

[22] Filed: Sep. 14, 1998

[51] Int. Cl.[6] .................................................. B60R 19/02
[52] U.S. Cl. ........................................................... 293/106
[58] Field of Search ............................................. 293/106

[56]            References Cited

U.S. PATENT DOCUMENTS

| | | | |
|---|---|---|---|
| 3,471,070 | 10/1969 | Olson | 293/106 |
| 3,614,136 | 10/1971 | Dent | 293/106 |
| 4,674,782 | 6/1987 | Helber | 293/106 |
| 4,961,604 | 10/1990 | Kisner | 293/106 |
| 4,993,610 | 2/1991 | Abretske et al. | 293/106 |
| 5,016,932 | 5/1991 | Carter | 293/106 |
| 5,135,274 | 8/1992 | Dodd | 293/106 |
| 5,364,142 | 11/1994 | Coiner | 293/106 |
| 5,823,585 | 10/1998 | Tanguay | 293/106 |

*Primary Examiner*—Gary C. Hoge

[57]            ABSTRACT

A vehicle bumper and a method of manufacturing, and a vehicle having, the same. In one embodiment, the bumper includes: (1) an elongated bumper body having a recess and a mount that allows the bumper body to be affixed to a service vehicle and (2) a lid hingedly coupled to the bumper body proximate the recess to form a compartment, the lid rotatable between an open position in which the compartment is exposed to allow access to an object therein and a closed position in which the object is retained in the compartment during movement of the vehicle.

10 Claims, 3 Drawing Sheets

VEHICLE BUMPER WITH INTEGRAL JACK METHOD OF MANUFACTURE THEREOF

TECHNICAL FIELD OF THE INVENTION

The present invention is directed, in general, to vehicle bumpers and, more specifically, to a vehicle bumper having an integral jack and a method of manufacturing the same.

BACKGROUND OF THE INVENTION

The recent introduction of mobile oil change operations to service automotive fleets has met with phenomenal acceptance. Therefore, the construction and use of a mobile lubricant recovery and delivery system is described in co-pending application Ser. No. 09/036,748, filed on Mar. 9, 1998, entitled "Integrated Lubricant Delivery and Retrieval Pallet and Method of Manufacture Thereof," commonly assigned with the present application and incorporated herein by reference. Not addressed in the co-pending application is the need for storage of the various tools and supplies necessary to perform the oil change. One skilled in the art will understand that a variety of tools are required to be aboard the servicing vehicle, e.g., wrenches, screwdrivers, a hydraulic or pneumatic jack, etc. Most typically, the largest of these tools is the hand operated, automotive hydraulic jack, also commonly known as a service jack or floor jack. A service jack is used to raise at least part of the serviced vehicle from the parking lot surface to accomplish the oil change. A system of this nature is necessary to provide the service attendant with access to remove and replace the oil drain plug, and sometimes the oil filter, of the serviced vehicle and to provide room for the oil catch basin during the oil draining operation. In order to have the service jack available at the service site, a location on or within the servicing vehicle must be designed to accommodate its storage during vehicle transit between servicing sites. Even the smallest service jack capable of lifting a nominal 2½ tons weighs a minimum of about 30 pounds. Therefore, some provision must be made to secure the jack within the servicing vehicle to prevent the jack from moving when the vehicle is in motion, lest some equipment be damaged. Thus in the prior art, a specific storage location over the rear wheel well within the service vehicle has been designated and equipped to secure the service jack. With the service jack secured within the cargo compartment of the service vehicle, it must be removed from the vehicle to the normal use location on the parking lot surface. The traditional approach is for the jack to be lifted into and out of the cargo compartment by the service attendant. Although 30 pounds is well within the normal lifting capacity of an adult service attendant, the repetitive nature of loading and unloading the jack into the service vehicle introduces a significant hazard for improper lifting techniques which can cause injury to the back of the attendant or the possibility of dropping the jack on the attendant's foot. The deeper the storage location for the jack is within the cargo compartment of the service vehicle, the higher is the risk of back injury to the attendant. The current location available for the service jack storage, i.e., over the rear wheel well, increases the hazard of improper alignment of the spine and possible injury. The attendant must lean substantially over the rear bumper and into the cargo compartment of the service vehicle. Additionally, the storage of the jack within the cargo compartment takes up space that might otherwise be used for storage of oil filters, air filters, or other supplies.

Therefore, what is needed in the art is a more efficient way of storing and securing a service jack or other objects on or within a mobile oil service vehicle.

SUMMARY OF THE INVENTION

To address the above-discussed deficiencies of the prior art, it is a primary object of the present invention to provide an advantageous way to store objects on a vehicle.

In the attainment of the above-described primary object, the present invention provides a vehicle bumper and a method of manufacturing, and a vehicle having the same. In one embodiment, the bumper includes: (1) an elongated bumper body having a recess and a mount that allows the bumper body to be affixed to a service vehicle and (2) a lid hingedly coupled to the bumper body proximate the recess to form a compartment, the lid rotatable between an open position in which the compartment is exposed to allow access to an object therein and a closed position in which the object is retained in the compartment during movement of the vehicle.

The present invention therefore introduces the broad concept of providing a covered compartment in a bumper to allow an object, such as a hydraulic jack, to be stored within the compartment. Space within the vehicle, which the object would otherwise occupy, is freed for use by other objects. Further, since the bumper is located proximate an outer perimeter of the vehicle, the compartment is more accessible than more inward locations within the vehicle. This is particularly advantageous when the object is heavy.

In one embodiment of the present invention, the bumper further includes a hydraulic jack located within the compartment. Of course, the present invention encompasses all manner of objects. In the environment of automotive servicing vehicles, objects may include tools, such as screwdrivers, wrenches and hammers, and supplies, such as filters, belts and hoses.

In one embodiment of the present invention, the bumper further includes an object mount coupled to the bumper body in the recess and adapted to receive and restrain the object within the compartment. Alternatively, the object mount may be coupled to the lid. Either way, the object mount provides positive retention for the object within the compartment. If the object is a hydraulic jack, the object mount may take the form of a threaded stud welded to the bumper body or the lid. After the jack is placed on the stud, a wing nut can be threaded thereon to restrain the jack. The object mount can also take the form of a clamp.

In one embodiment of the present invention, the bumper further includes a locking member, coupled to the bumper body and the lid, that allows the lid to be locked in the closed position. The locking member may take the form of a hasp, lockable by way of a combination or key lock. Alternatively, the locking member may be a lock that is permanently coupled to the bumper body or the lid.

In one embodiment of the present invention, the lid is composed of a sheet of metallic material, the lid shielding the compartment from an environment surrounding the bumper. Alternatively, the lid may be composed of a mesh, allowing the contents of the compartment to be viewed from without. The lid may also be composed of a material other than metal.

In one embodiment of the present invention, the recess is formed in two surfaces of the bumper body, the lid having a break formed therein to allow the lid to wrap about the recess. The two surfaces may be any two of the upper, rear and side (as the bumper is properly oriented as installed on the service vehicle) surfaces of the bumper body. An embodiment to be illustrated and described adopts this configuration. Alternatively, of course, the recess may be formed in only one surface of the bumper body. The lid can be flat to cover the recess.

In one embodiment of the present invention, the lid is hinged proximate a lower edge of the bumper body. Alternatively, the lid may be hinged proximate an upper edge of the bumper body or on a side of the lid to yield a horizontal swing.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION

Figure 1:
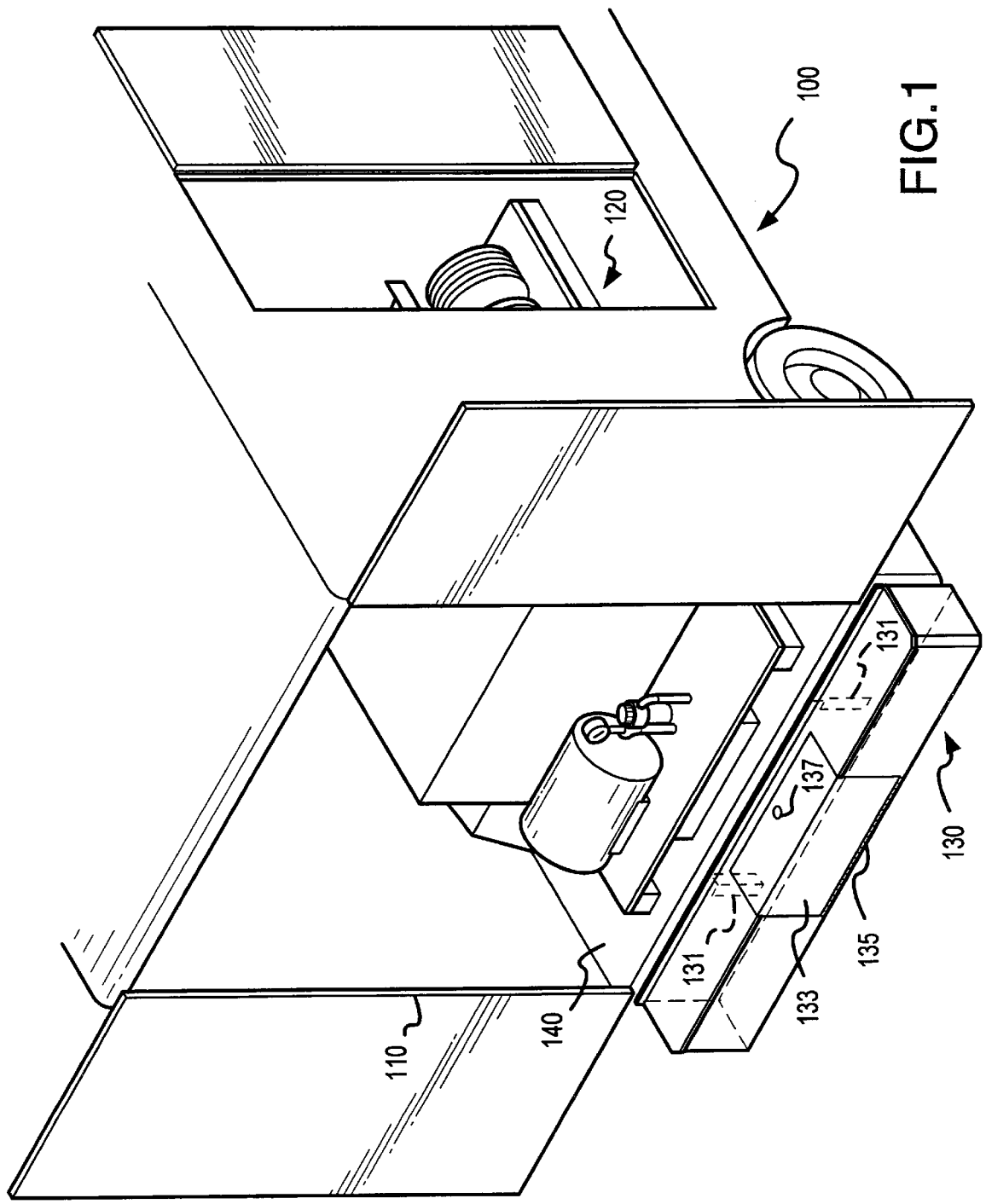
FIG. 1 illustrates a rear view of one embodiment of a mobile oil service vehicle constructed according to the principles of the present invention.

Referring initially to FIG. 1, illustrated is a rear view of one embodiment of a mobile oil service vehicle constructed according to the principles of the present invention. A mobile oil service vehicle, generally designated 100, comprises a vehicle shell 110, an oil service pallet 120, and an elongated bumper body 130. The service vehicle shell 110 is a commercially available motor vehicle with a cargo bed 140 to which the oil service pallet 120 is attached. The oil service pallet 120 is described in co-pending application Ser. No. 09/036,748, filed Mar. 9, 1998, entitled "Integrated Lubricant Delivery and Retrieval Pallet and Method of Manufacture Thereof." The bumper body 130 comprises a plurality of bumper mounts 131, a compartment lid 133, a hinge 135, and a lock 137. The bumper body 130 is constructed of a substantial material such as metal, deemed suitable for the intended purposes to be described. The bumper mounts 131 provide the means by which the bumper body 130 is attached to the vehicle shell 110. In the illustrated embodiment, the compartment lid 133 is formed of two surfaces of sheet metal which follow the contours of the top and rear face of the bumper body 130. Alternatively, all or a portion of the lid 133 may be composed of an open material such as expanded steel mesh, allowing the contents of the compartment to be viewed from without. When using an open material such as steel mesh, the lid may comprise an inner transparent plastic material such as LUCITE® to protect the contents from weather or road debris. The lid 133 may also be composed of a material other than metal such as plastic. In the illustrated embodiment, the compartment lid 133 is attached to the lower rear edge of the bumper body 130 by the hinge 135 which provides the means to open the compartment lid 133. In an alternative embodiment, the lid 133 is hinged about the forward upper edge of the bumper body 130. In an alternative embodiment, the lid may be a single surface which is either hinged or slides within grooves formed in the bumper body. In another alternative embodiment to be described in FIG. 4, the lid may comprise the top, rear, and side surfaces of the bumper. In yet another alternative embodiment, the lid is formed of two or more panels which interlock. When closed, the lid 133 provides security and protection from road debris and climatic conditions for the objects contained therein, especially while the service vehicle 100 is in motion. One skilled in the art will recognize that further variations on the nature of the lid and its hinge mechanism are clearly within the greater scope of the present invention. The lock 137 provides security for the object(s) to be contained within a recess formed under the compartment lid 133. As can be seen in FIG. 1, the storage compartment of the present invention is conveniently accessible from outside of the vehicle. Heavy objects, such as a service jack, thus require less lifting and handling than in the prior art.

Figure 2:
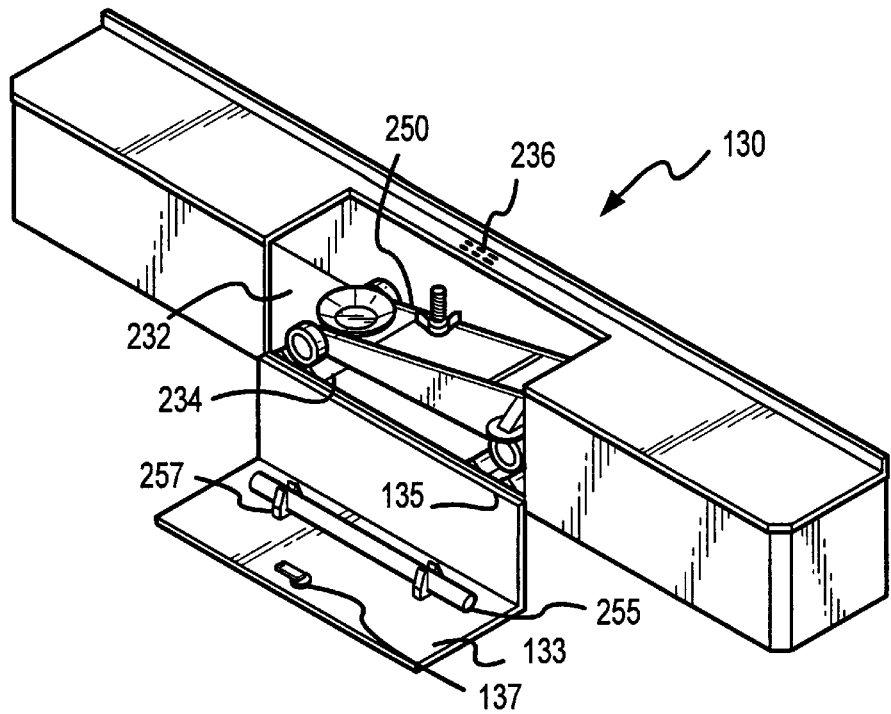
FIG. 2 illustrates an isometric view of the bumper of FIG. 1 with the compartment lid in the open position.

Referring now to FIG. 2, illustrated is an isometric view of the bumper of FIG. 1 with the compartment lid in the open position. The bumper body 130 is sufficiently elongated along the longitudinal axis of the vehicle 110 to provide room to contain one or more objects. A recess 232 of sufficient size to retain the desired object(s) is formed in the bumper body 130. The recess 232 and lid 133 cooperate to form an accessible compartment for the storage of tools. In the illustrated embodiment, the tool being stored is a service jack 250. Within the recess 232 an object mount 234 is attached to the bumper body 130 and provided to accommodate the service jack 250 to be retained. The recess 232 and the jack 250 are accessible when the lid 133 is rotated to its open position about the hinge 135. A jack handle 255 is secured to the compartment lid 133 by elastic fasteners 257. One skilled in the art will understand that a variety of alternative methods of securing the jack handle 255 within the compartment 232 are clearly within the scope and intent of the present invention.

In the illustrated embodiment, the lid 133 is equipped with a bolt-type lock 137 which engages a slot 236 formed in the bumper body 130. The lock 137 permits the contents of the compartment to be secured against theft. In an alternative embodiment, the lock 137 comprises a plurality of locking rods which mechanically extend from the edges of the lid 133 and engage recesses in the sides of the compartment. In yet another embodiment, the lock 137 may be a combination lock. In an alternative embodiment, the lid 133 may be equipped with one or more hasps to permit the owner to use an appropriate number of combination or key padlocks of the desired security level. In yet another embodiment, the lock 137 may be affixed to the bumper body 130 and, when locked, engage a slot, recess or other structure on the compartment lid 133. One skilled in the art will recognize that variations on the type or configuration of the lock are clearly within the scope of the present invention.

Figure 3:
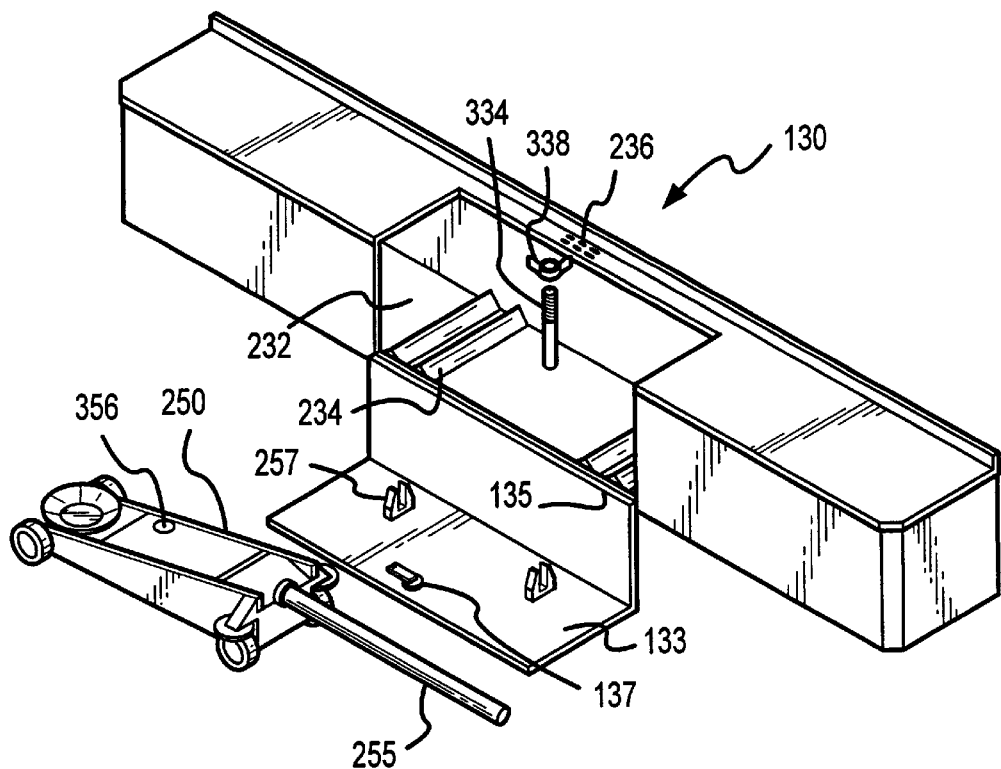
FIG. 3 illustrates an exploded isometric view of the bumper of FIG. 2.

Referring now to FIG. 3, illustrated is an exploded isometric view of the bumper of FIG. 2. In the illustrated embodiment, the object mount 234 is contoured to conform to the shape of the service jack 250 which is to be stored within the recess 232. However, one skilled in the art will recognize that contouring of the object mount is not an essential element of the present invention. The object mount 234 includes a threaded stud 334 which passes through a hole 356 in the service jack 250. When the service jack 250 is in position on the object mount 234 with the stud 334 accessible, a matching wing nut 338 is threaded onto the stud 334, securing the service jack 250 to the object mount 234 and the bumper body 130 as shown in FIG. 2. In an alternative embodiment, the object mount 234 is attached to an interior surface of the compartment lid 133. In this embodiment, once the jack is attached to the object mount, the lid 133 and jack 250 are rotated into the closed position and locked. In yet another alternative embodiment, a clamp is substituted for the threaded stud 334.

Figure 4:
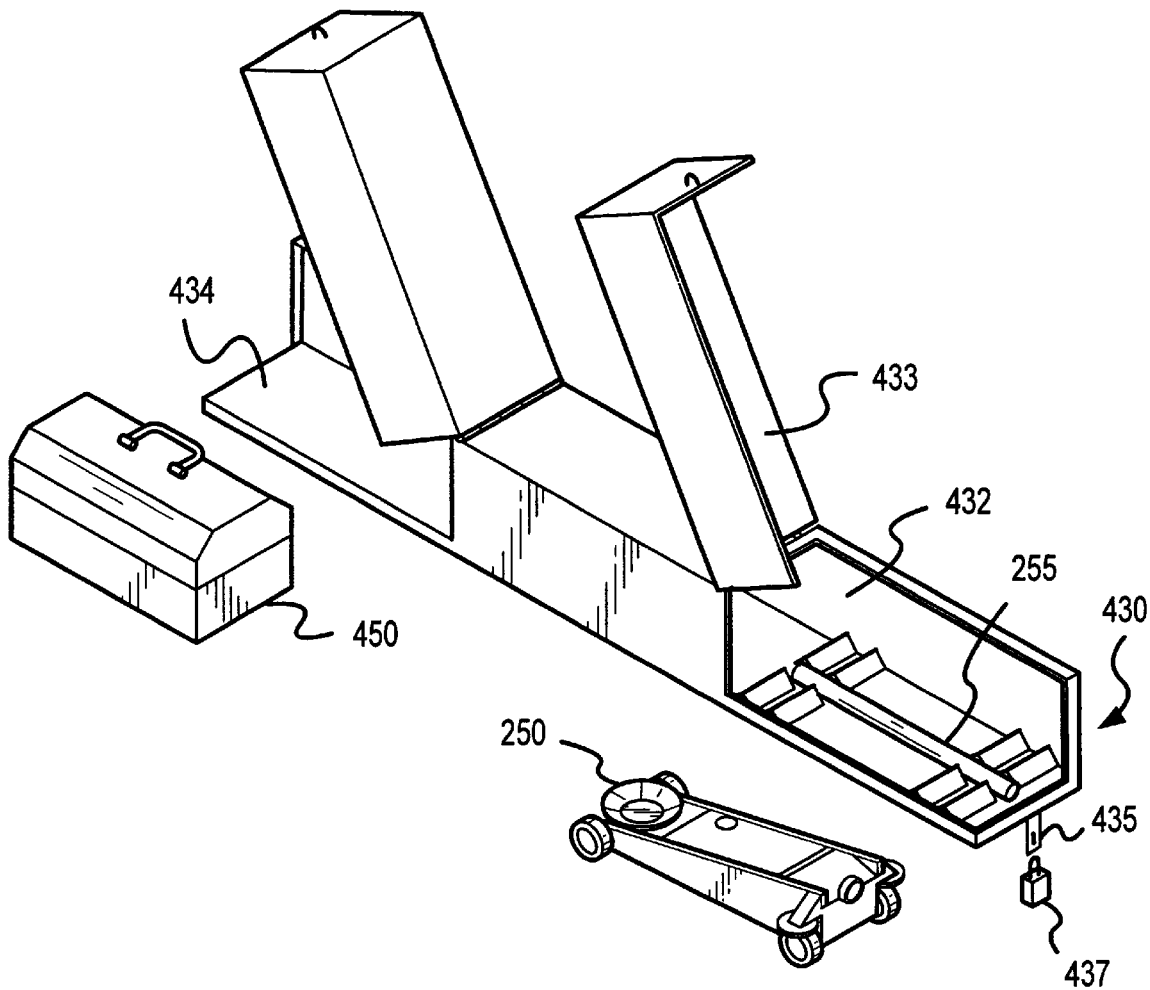
FIG. 4 illustrates an exploded isometric view of an alternative embodiment of the bumper of FIG. 2.

Referring now to FIG. 4, illustrated is an exploded isometric view of an alternative embodiment of the bumper of FIG. 2. In the illustrated embodiment a recess 432 has been provided for the service jack 250, and an additional recess 434 has been formed in the bumper body 430 providing storage space for a tool box 450. After the service jack, the next heaviest object within a service vehicle 110 which must be routinely loaded or removed is the tool box 450. By providing an additional compartment for the tool box 450, safety of the attendant is enhanced. One skilled in the art will recognize that additional recesses may be designed such that other tools or objects considered advantageous to the function of the service vehicle could likewise be secured within compartments in the bumper body while remaining within the scope of the present invention. Additionally, FIG. 4 illustrates alternative embodiments of the lid 433 such that the lid is hinged along the longitudinal axis of the vehicle 110. In this embodiment, each lid 433 comprises three surfaces of the bumper 430 and includes a hasp 435 and padlock 437 for securing the contents of the compartments 432, 434. Also shown is one alternative embodiment of how the jack handle 255 may be stored within the storage recess 432 under the jack 250.

Although the present invention and its advantages have been described in detail, those skilled in the art should understand that they can make various changes, substitutions and alterations herein without departing from the spirit and scope of the invention in its broadest form.

What is claimed is:

1. A vehicle bumper, comprising:

an elongated bumper body having a recess and a mount that allows said bumper body to be affixed to a service vehicle; and a lid hingedly coupled to said bumper body proximate said recess and a lower edge of said bumper body to form a compartment, said lid rotatable between an open position in which said compartment is exposed to allow access to an object therein and a closed position in which said object is retained in said compartment during movement of said vehicle.

2. The bumper as recited in claim 1 further comprising an object mount coupled to said bumper body in said recess and adapted to receive and restrain said object within said compartment.

3. The bumper as recited in claim 1 further comprising a locking member, coupled to said bumper body and said lid, that allows said lid to be locked in said closed position.

4. The bumper as recited in claim 1 wherein said lid is composed of a sheet of metallic material, said lid shielding said compartment from an environment surrounding said bumper.

5. The bumper as recited in claim 1 wherein said recess is formed in two surfaces of said bumper body, said lid having a break formed therein to allow said lid to wrap about said recess.

6. A method of manufacturing a vehicle bumper, comprising the steps of:

forming an elongated bumper body having a recess and a mount that allows said bumper body to be affixed to a service vehicle; and hingedly coupling a lid to said bumper body proximate said recess and a lower edge of said bumper body to form a compartment, said lid rotatable between an open position in which said compartment is exposed to allow access to an object therein and a closed position in which said object is retained in said compartment during movement of said vehicle.

7. The method as recited in claim 6 further comprising the step of coupling an object mount to said bumper body in said recess, said object mount adapted to receive and restrain said object within said compartment.

8. The method as recited in claim 6 further comprising the step of coupling a locking member to said bumper body and said lid, said locking member allowing said lid to be locked in said closed position.

9. The method as recited in claim 6 wherein said lid is composed of a sheet of metallic material, said lid shielding said compartment from an environment surrounding said bumper.

10. The method as recited in claim 6 wherein said step of forming comprises the step of forming said recess in two surfaces of said bumper body, said method further comprising the step of forming a break in said lid to allow said lid to wrap about said recess.

* * * * *